United States Patent
Kalisz

[11] Patent Number: 6,164,589
[45] Date of Patent: Dec. 26, 2000

[54] CENTERLINE LANDING GEAR FOR AEROCRAFT

[75] Inventor: John Kalisz, Newhall, Calif.

[73] Assignee: Lockheed Martin Corporation, Palmdale, Calif.

[21] Appl. No.: 09/313,309

[22] Filed: May 17, 1999

[51] Int. Cl.[7] ................................ B64B 1/00
[52] U.S. Cl. ............... 244/5; 244/30; 244/97; 244/102 A
[58] Field of Search ................... 244/5, 102 A, 244/24, 30, 96, 97

[56] References Cited

U.S. PATENT DOCUMENTS

| | | | |
|---|---|---|---|
| 1,844,765 | 2/1932 | Jackson | 244/5 |
| 1,859,422 | 5/1932 | Ambruso | 244/5 |
| 3,753,539 | 8/1973 | Moore | 244/5 |
| 5,005,783 | 4/1991 | Taylor | 244/5 |
| 5,351,911 | 10/1994 | Neumayr | 244/5 |

*Primary Examiner*—J. Woodrow Eldred
*Attorney, Agent, or Firm*—Robert A. Schruhl

[57] ABSTRACT

A partially buoyant aircraft capable of transporting very large cargo payloads comprises a lifting body with an exterior airfoil configuration that includes internal structural support members for an exterior skin, the skin defining an internal volume for storing the cargo, propulsion apparatus, flight stabilization apparatus on a portion of the lifting body, lift assisting apparatus carried within the lifting body, and landing gear arranged in close proximity to the longitudinal centerline of the lifting body. Each landing gear comprises a wheel supported by a cylinder set including upper and lower telescoping cylinders, the upper cylinders of the wheels being ported together to operate as a single element.

10 Claims, 2 Drawing Sheets

CENTERLINE LANDING GEAR FOR AEROCRAFT

BACKGROUND OF THE INVENTION

1. Field of the Invention

The present invention relates to buoyant aircraft, and more particularly to buoyant aircraft having internal structural support components exhibiting a geodesic configuration.

2. Description of the Related Art

In recent years, air vehicles designed for transporting passenger and cargo have undergone many changes. Driven by rapidly developing new technologies and the influx of many new companies into global commerce, various body and engine designs and modifications have been developed resulting in aircraft capable of carrying greater passenger and cargo payloads for greater distances and for longer times. But many of these aircraft are expensive to develop and produce, and improvements including increases in engine efficiencies, wing aerodynamics and vehicle size have only provided limited gains.

The cost of airborne transport vehicles can be reduced significantly by designing for lower speed and altitude, and using buoyant lift to replace the aerodynamic lift produced by expensive-to-build and expensive-to-fly wings. The size of the vehicle and its associated payload capacity must be large enough, however, to compensate for the slower cruise speed.

Typically, airships of this type require landing gear that will adequately handle the weight associated with the large loads that such vehicles are capable of carrying.

U.S. Pat. No. 4,052,025 to Clark et al. discloses an airborne vehicle that uses buoyant cells pressurized to augment the craft's lift. The majority of the lift is produced by the wings and an aerodynamically shaped fuselage defining a lifting body that imparts considerable aerodynamic lift to the aircraft when in flight in an airstream with a minimum of aerodynamic drag. The body of the aircraft is a rigid exoskeleton consisting of a web of tension members helically wrapped around the fuselage. Propulsion is provided by a combination of jet engines and turboprop engines. Other aircraft that are known to use buoyant cells to augment lift produced predominantly by wings include those shown in U.S. Pat. No. 5,425,515 to Hirose, U.S. Pat. No. 3,907,218 to Miller, U.S. Pat. No. 3,913,871 to Miller, U.S. Pat. No. 4,889,297 to Ikeda, U.S. Pat. No. 3,032,298 to Callahan, and U.S. Pat. No. 3,856,238 to Malvestuto, Jr.

Typical landing gear arrangements that are used on aircraft have some width relative to the height of the center of gravity that allows a wide enough stance that the aircraft is stable in roll during ground operation. Large commercial aircraft may have a gear stance of 50 feet to achieve stable operation with their relatively low center of gravity and this is narrow enough to operate on typical Class VI 200 feet wide runways. As vehicle size increases, gear width increases to an unacceptable width that precludes operation on even the largest commercial runways. The wide stance provides plenty of stability for good vehicle performance, but for a transportation system that has to operate within existing airport infrastructure, this width is unacceptable.

Against this background of known technology, the applicants have developed a new landing gear arrangement for a buoyant air vehicle, which provides substantial stability for the air vehicle, while reacting turning and braking loads.

OBJECTS AND SUMMARY OF THE INVENTION

It is therefore an object of the present invention to provide a landing gear apparatus for a buoyant air vehicle in which the landing gear is located on the centerline of the vehicle, and which provides adequate support for the air vehicle and reacts turning and braking loads, while overcoming many of the disadvantages and drawbacks of similar landing gear arrangements known in the art.

Another object of the invention is to provide a novel "centerline" landing gear arrangement for a buoyant air vehicle which enables all wheels to have the same ground reaction load, thus minimizing single gear overload and thereby permitting operation from existing runways.

Still another object of the present invention is to provide a novel landing gear for a buoyant air vehicle which is located along the longitudinal centerline of the air vehicle in such a manner that braking energy loads are distributed uniformly into all brake sets.

Still another object of the invention is to provide novel landing gear that prevent braking loads from generating adverse yawing moments typically seen when the upwind gear unloads and skids for conventional gear arrangements.

DETAILED DESCRIPTION OF THE INVENTION

Figure 1:
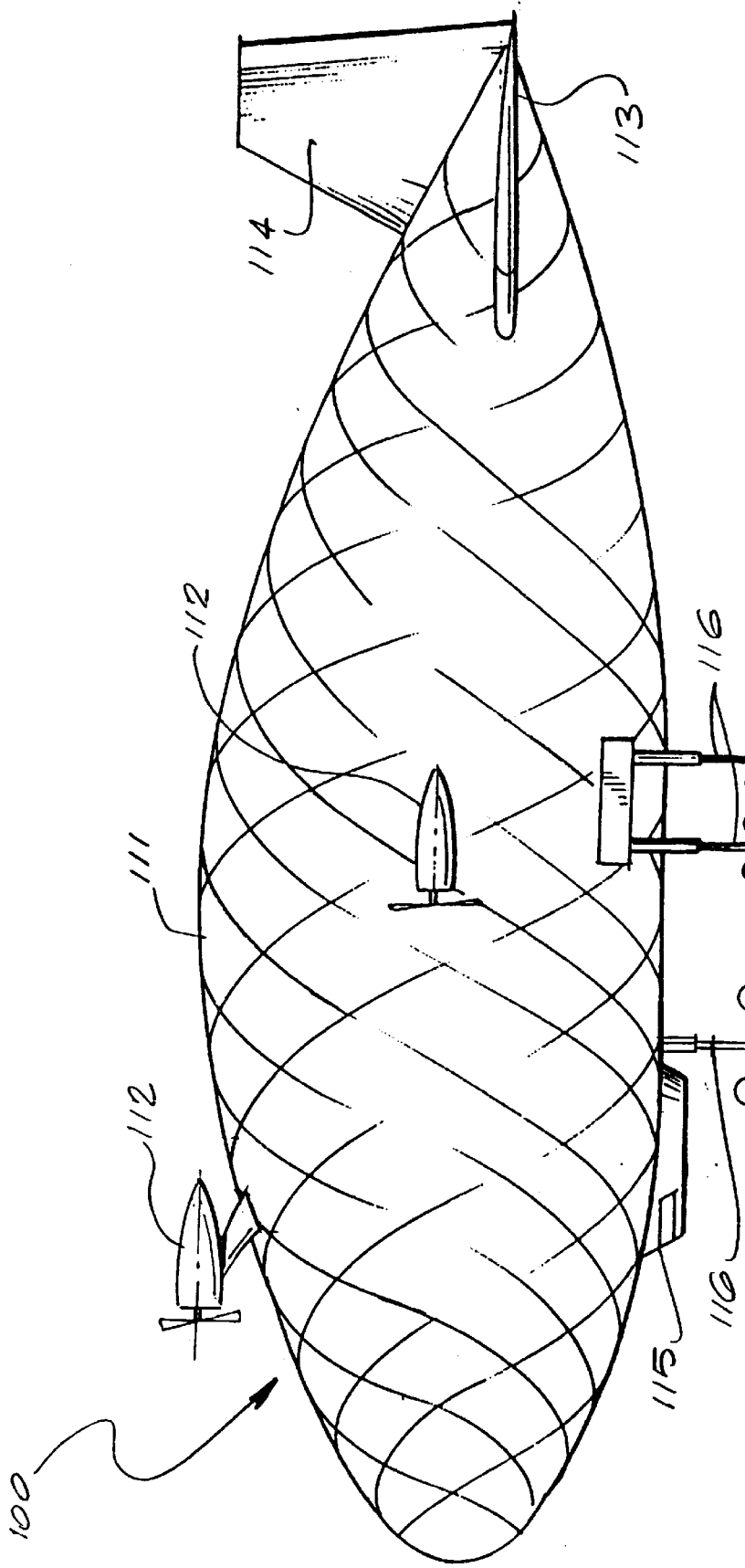
FIG. 1 is a side view of the air vehicle of the present invention showing the landing gear apparatus.
Figure 2:
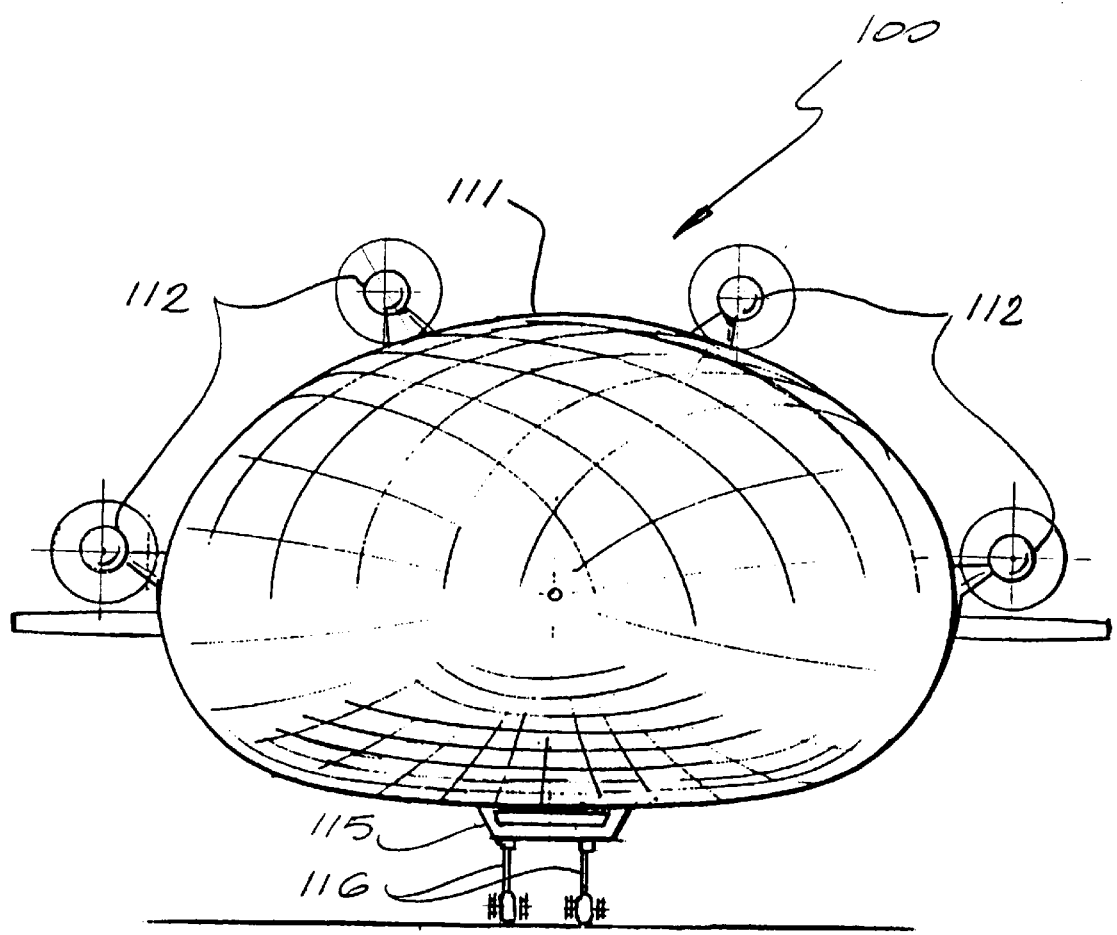
FIG. 2 is a front view of the air vehicle shown in FIG. 1.

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide an air vehicle including landing gear of novel construction that encompasses many long sought after features that make transport of extremely large payloads easier and less expensive.

The air vehicle contemplated by the present invention is an ultra-large, buoyant, multi-purpose vehicle capable of short take-off and landings (STOL) from a conventional runway, typically on the order of 200–300 feet wide and about 10,000 feet long.

Structurally, the air vehicle 100 of the present invention is a combines features of a conventional aircraft and a dirigible, and includes an internal geodesically configured support structure 110. In contrast with traditional aircraft, the air vehicle of the invention has substantial payload volume which allows for the carriage of outsized or large volume cargoes. In addition, the air vehicle 100 of the present invention achieves a large portion of its lift from aerodynamic forces generated by the shape of the craft's body.

The air vehicle 100 has a deltoid shaped lifting body 111, propulsion means 112 located at selected portions of the lifting body, horizontally extensive strakes 113 at a rear portion of the body, a vertical rudder 114, a flight and crew station 115, and landing gear 116.

The cross sectional shape of the lifting body 111 is designed for efficiently producing lift, and is thick enough to obtain desired cargo volume requirements. The deltoid shape of the lifting body provides the best aspect ratio, and therefore the lowest drag due to lift which results in the lowest fuel weight and propulsion power requirements.

The strakes 113 on the body provide a shift in the aerodynamic center of the vehicle which increases the aspect ratio by increasing vehicle span without a large weight penalty. Strakelets (not shown) at the ends of the strakes may be provided to help make the tip of the strake more aerodynamically efficient.

In one embodiment of the vehicle, the total internal volume could be 30 million cubic feet. This large volume would be required to fly with a million pounds of payload using internal lift from a lighter-than-air gas, such as helium, and external aerodynamic lift produced by the flow of ambient air over the body and the strakes. The vehicle could be on the order of 740 feet long, 480 feet wide, and 220 feet high, and could have a takeoff mass of about 3 million pounds split almost equally between empty weight, fuel weight, and payload. As a result of the buoyancy produced by the lighter-than-air gas, the weight on the landing gear would be only about half of the takeoff mass, i.e., on the order of 1.5 million pounds.

The flight and crew station 115 is positioned beneath the lifting body, thereby allowing for good visibility. Preferably, station 115 is located above the payload bay so that in a crash, it would not be damaged by the payload shifting forward.

The landing gear 116 includes wheels capable of bearing the stress of the aerocraft when it lands on the runway. A significant portion of the vehicle lift is provided by the lighter-than-air gas contained in the vehicle. The center of buoyancy is well above the vehicle center of gravity, thus producing a stabilizing pendulum effect. This added stability improves both the pitch and the roll axes. The centerline landing gear arrangement offers little roll restoring moment compared to a wide stance arrangement, but the natural buoyancy effect provides some restoring moment which helps prevent overturning during ground operations.

Each landing gear includes a cylinder set, preferably comprising upper and lower telescoping cylinders, facilitating extension and retraction of the respective landing gear. This cylinder set arrangement allows the vehicle to lower itself on the ground to improve compatibility with ground support equipment, and reduce cargo loading and unloading time. The upper cylinders of the landing gear are ported together and this gear cluster operates as a single element with a center-of-percussion in the middle of the cluster. Configured in this way, the landing gear offers little reaction to pitch or roll movements of the vehicle.

Engines can be located on lateral portions, fore and/or aft, of the center of gravity of the lifting body 111, enabling pitch vectoring from about −110° to +110°. Propulsive lift and control during vertical operation are achievable by a combination of engine throttle position and thrust vector angle. To reduce the lift loss, additional engines could be added to either side of the vehicle on or near the vehicle center of gravity.

Cargo and equipment can be loaded onto the payload bay through doors located at the forward and aft ends of each run. Rollers can be installed in the floor to accommodate cargo containers and pallets. The payload can be loaded and unloaded quickly through a simultaneous roll on and roll off capability along the payload runs. The vehicle buoyancy system preferably includes a plurality of helium filled bags arranged inside the lifting body 111 on each side of the body between the frames. Fore and aft helium bags may be interconnected so that helium can be transferred back and forth for vehicle trim. The present invention contemplates use of a buoyancy management system to insure that the vehicle is sufficiently heavy to land with adequate control during adverse weather conditions.

The pendulum stabilizing effect of the vehicle requires relatively large roll excursions to generate significant restoring moments. The vehicle will roll back and forth during taxi and runway operations, and must be aided with an active propulsion control system to provide active roll control when combined with tire friction to prevent the vehicle being blown downwind.

Those skilled in the art will appreciate that various adoptions and modifications of the invention as described above can be configured without departing from the scope and spirit of the invention. Therefore, it is to be understood that, within the scope of the appended claims, the invention may be practiced other than as specifically described herein.

What I claim is:

1. A partially buoyant aircraft capable of transporting very large cargo payloads, said aircraft comprising:

A lifting body with an exterior airfoil configuration, said body including internal structural support members, and skin means extending over said skeleton to define an internal volume for storing the cargo, propulsion means supported on said lifting body, flight stabilization means on a portion of said lifting body, lift assisting means carried within said internal volume, and landing gear arranged in close proximity to the longitudinal centerline of said lifting body, said landing gear comprising a wheel supported by a cylinder set including upper and lower telescoping cylinders, the upper cylinders of said landing gear wheels being ported together so as to operate as a single element.

2. The aircraft of claim 1, wherein said propulsion means is disposed on opposite sides of said lifting body at fore and aft locations.

3. The aircraft of claim 1, wherein said internal volume of said lifting body has an upper portion and a lower portion for said cargo, said lift assisting means comprising a container housing a lighter-than-air gas.

4. The aircraft of claim 1 wherein said lifting body includes a vehicle buoyancy system which includes a plurality of lighter-than-air gas filled bags inside the lifting body on each side of the body.

5. The aircraft of claim 4 wherein said vehicle buoyancy system includes fore and aft gas filled bags that are interconnected so that the lighter-than-air gas may be transferred back and forth for vehicle trim.

6. The aircraft of claim 5 wherein said lighter-than-air gas is helium.

7. The aircraft of claim 1 wherein said lifting body has an overall deltoid configuration.

8. The aircraft of claim 1, and further including a flight and crew station on a forward portion of said lifting body.

9. The aircraft of claim 1 wherein said lifting body has a center of buoyancy that is well above its center of gravity, thus producing a stabilizing pendulum effect.

10. The aircraft of claim 9 wherein said stabilizing pendulum effect results in improved pitch and rolls axes.

* * * * *